Figure 1:
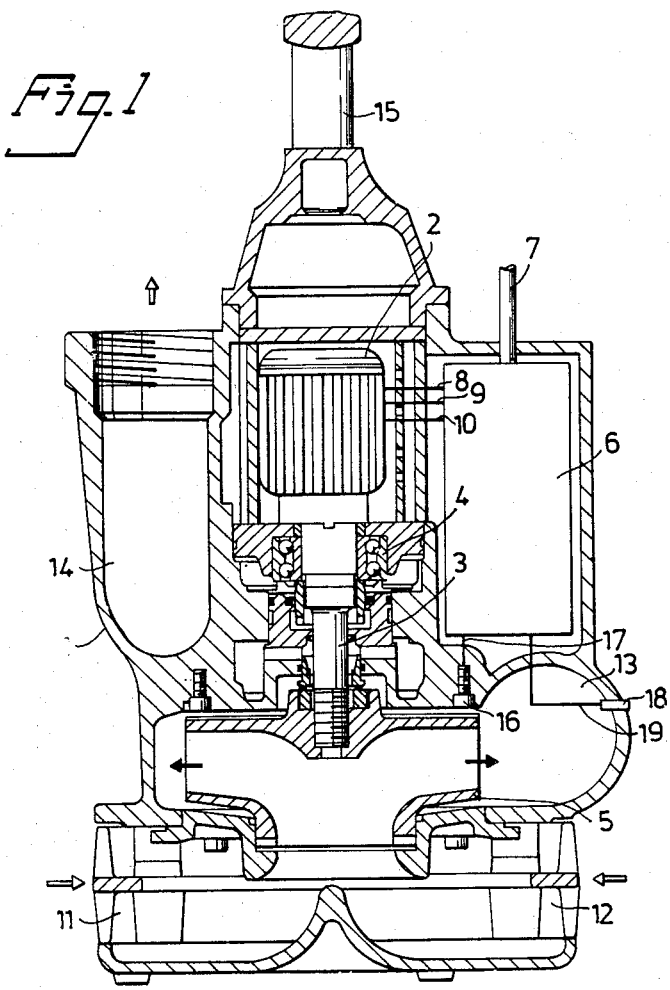

United States Patent [19]

Hartwig

[11] Patent Number: 4,511,312

[45] Date of Patent: Apr. 16, 1985

[54] METHOD OF DRIVING THE IMPELLER OF A LIQUID PUMP BY MEANS OF A BRUSHLESS A.C. MOTOR; AND A LIQUID PUMP FOR CARRYING OUT THE METHOD

[75] Inventor: Carl S. M. Hartwig, Täby, Sweden

[73] Assignee: Institut Cerac S.A., Ecublens, Switzerland

[21] Appl. No.: 499,980

[22] Filed: Jun. 1, 1983

[30] Foreign Application Priority Data

Jul. 28, 1982 [CH] Switzerland .................. 4578/82

[51] Int. Cl.³ .................................. F04B 49/06
[52] U.S. Cl. ................................. 417/45; 318/802; 417/53; 417/424
[58] Field of Search ................. 318/254, 798–802, 318/805; 417/424, 45, 38; 415/118

[56] References Cited

U.S. PATENT DOCUMENTS

| 3,418,936 | 12/1968 | Dowdican et al. | 417/38 |
| 3,499,297 | 3/1970 | Ruff et al. | 62/226 X |
| 3,796,935 | 3/1974 | Blaschke | 318/801 |
| 3,959,705 | 5/1976 | Salihi | 318/254 X |
| 4,259,620 | 3/1981 | Oates et al. | 363/132 X |
| 4,330,238 | 5/1982 | Hoffman | 417/45 X |

FOREIGN PATENT DOCUMENTS

| 2448447 | 5/1975 | Fed. Rep. of Germany | 318/801 |
| 2111773 | 6/1983 | United Kingdom | 318/801 |

Primary Examiner—Edward K. Look
Attorney, Agent, or Firm—Sughrue, Mion, Zinn, Macpeak, and Seas

[57] ABSTRACT

The invention relates to a method and apparatus for driving the impeller (5) in a turbo-type liquid pump operating at relatively low power and relatively high delivery head by means of an a.c. motor (2). The invention is mainly characterized in that the motor (2) is driven from a static inverter (6) which operates at an operating frequency of 100–1000 Hz. This enables high specific speed impellers to be used, and therewith provides a considerable increase in the efficiency and capacity of the pump at unchanged motor sizes.

11 Claims, 9 Drawing Figures

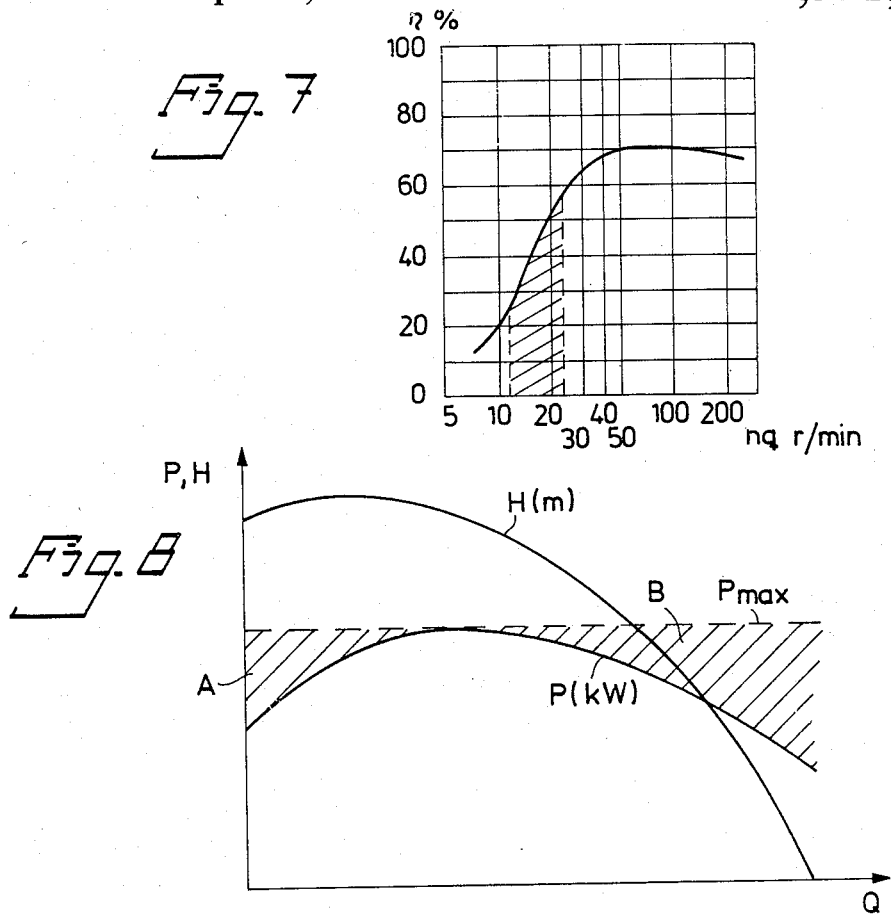
Fig. 7
Fig. 8
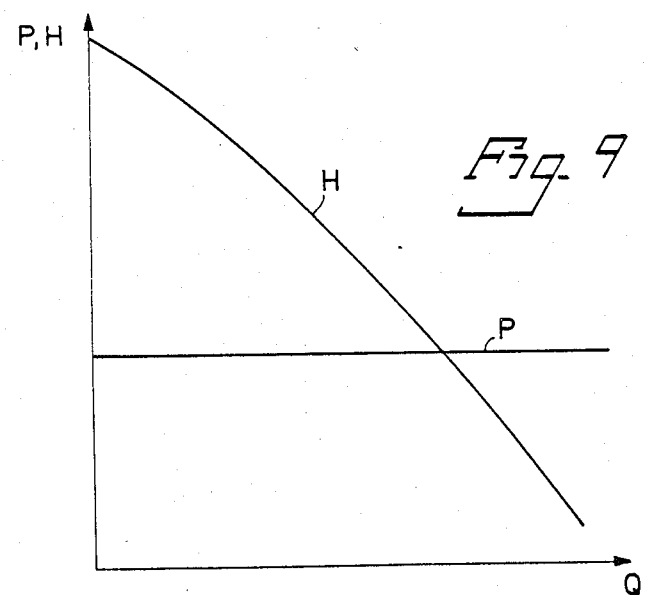
Fig. 9

METHOD OF DRIVING THE IMPELLER OF A LIQUID PUMP BY MEANS OF A BRUSHLESS A.C. MOTOR; AND A LIQUID PUMP FOR CARRYING OUT THE METHOD

The present invention relates to a method of driving the impeller of a turbo-type liquid pump operating with relatively low power output and high delivery head.

By turbo-type liquid pump is meant here, and in the following, pumps provided with axial or radial flow impellers. Such pumps are normally referred to as centrifugal pumps.

One requirement with liquid pumps of this kind, for example submersible sewage pumps, is that it must be possible to achieve a given, minimum head.

This head depends upon the speed at which the impeller rotates, its size and its geometric form, this latter parameter being characterized by the so-called specific speed. The head is determined by $$H \sim \left(\frac{n}{n_q}\sqrt{P}\right)^{\frac{2}{3}}$$

where n is the rotative speed of the impeller, $n_q$ is the specific speed of the impeller and P is the impeller output. Often such pumps are required to provide a relatively high head capacity while having but small external dimensions and since the highest motor speed which can be achieved with a two-pole motor when connecting the pump motor, a brushless a.c. motor such as a short-circuited asynchronous motor, directly to the mains, is 3,600/3000 r.p.m. (mains frequency 60/50 Hz) one is obliged to resort to an impeller of very low specific speed. A low specific speed means that a high-pressure impeller must be used, i.e. an impeller with relatively high internal losses and narrow channels or passages which are readily clogged by foreign matter, such as scraps of plastic, rags, etc., carried by the liquid being pumped.

In many instances, for example in connection with deepwell pumps, the use of low specific-speed impellers requires the impeller to be given dimensions which are totally impracticable, and it is consequently necessary to connect in series or stages a plurality of pumps whose dimensions permit them to be passed down through a hole in the well, or to connect together a plurality of suitably dimensioned impellers in series or stages in one and the same pump casing.

In the case of pumps of the kind aforementioned, direct connection to the a.c. network with a frequency of 60/50 Hz is encumbered with a further disadvantage, namely that the power input to the impeller, said power being equal to the power output of the pump, varies with the pump head required. Thus, when the pump is used for other, lower heads than the nominal or rated head, there is often found significant power reserves which go unused.

A further problem is that the need for submersible pumps of small external dimensions, intended to be lowered through pipes or narrow passages, has progressively increased in recent times. As a result, attempts have been made to reduce the external dimensions of the pumps without reducing the power output of the motor, which has resulted in a decrease in the radii of the impeller and in the throughflow passages or runners in the pump casing. Compromises of this nature result in an additional decrease in the specific efficiency of the high-pressure impeller.

Consequently, a prime object of the present invention is, with a given weight of the motor driving the impeller, to increase the power output and speed without decreasing the torque, and also to greatly increase the efficiency of the pump.

The speed of a given two-pole motor is increased by increasing the frequency of the operating voltage, drive energy being supplied via a static inverter, and preferably the number of poles of the motor is also increased by 2.n, where n is an integer greater than 1. Preferably, there are used four-pole or six-pole motors.

A change in the frequency from the aforementioned 50 Hz to 100 Hz will result in the speed of a two-pole motor increasing from 3000 r.p.m. to 6000 r.p.m., the output of the motor increasing at the same time. An important feature is that by increasing the speed there can be used an impeller of higher specific speed, i.e. an impeller which is very open and which has a smaller diameter than the high-pressure impellers used hitherto. The open impellers, which are preferably of the Francis-type or propeller-type, result in higher pump efficiency. In addition, such pumps are less likely to become blocked or clogged and the diameter can also be decreased. The obtained decrease in impeller diameter is an important advantage, and enables the spiral or annular channel or runner for pressure liquid surrounding the impeller to be made sufficiently spacious without requiring an increase in the external dimensions of the pump, or that in the case of extreme high-pressure pumps the number of series-connected impellers can be replaced with a smaller number of impellers or with a single impeller.

The object of the present invention is realized by means of the method and the pump set forth in the following claims.

The method according to the invention is mainly characterized in that energy is supplied to the motor via a static inverter having an output frequency in the order of 100–1000 Hz and that the frequency of the voltage supplied to the motor, the number of poles of said motor and the specific speed of the impeller are selected so as to minimise the pump dimensions in relation to the desired flow and/or head.

A liquid pump for carrying out the method is characterized in that a static inverter is arranged to supply energy to the motor with an output frequency in the order of 100–1000 Hz and that the impeller has a blade or vane form of the Francis or propeller type; and that the motor is arranged to drive the impeller at a high specific speed.

Figure 2:
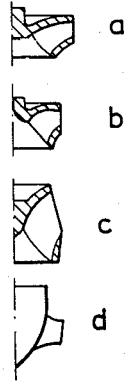
Figure 3:
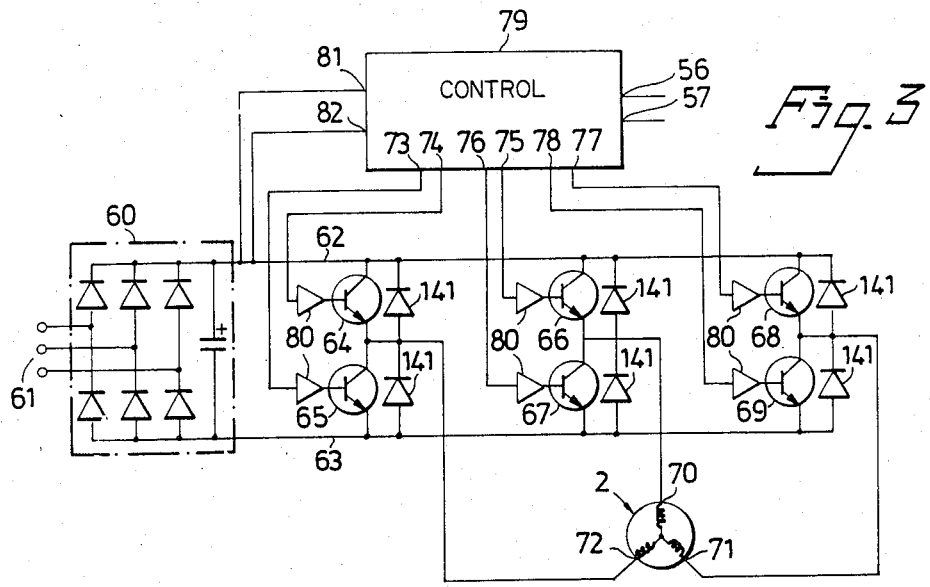
Figure 5:
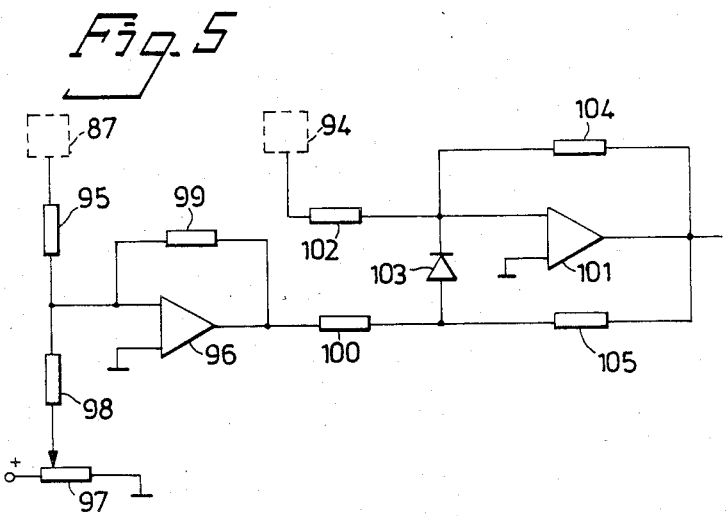
Figure 6:
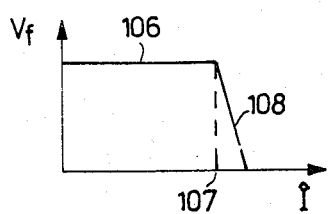
Figure 4:
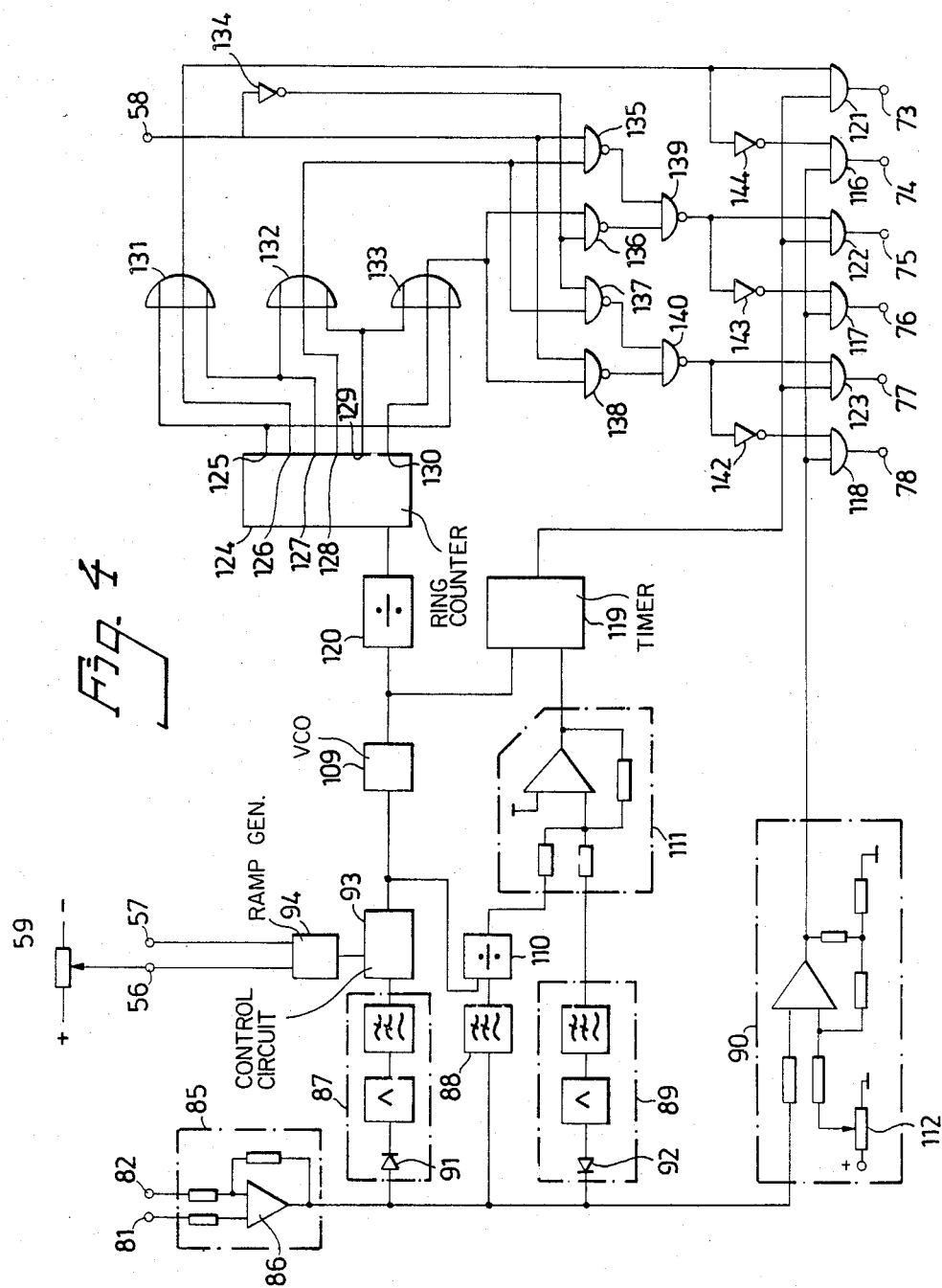

The invention will now be described in more detail with reference to the accompanying drawings, in which FIG. 1 is an axial sectional view of a liquid pump according to the invention, FIG. 2 illustrates impeller profiles, FIGS. 3–4 illustrates a suitable static inverter for the liquid pump shown in FIG. 1, FIG. 5 illustrates in more detail a circuit incorporated in the inverter, FIG. 6 illustrates the function of the circuit shown in FIG. 5, FIG. 7 shows the efficiency $\eta$ as a function of the specific speed $n_q$ of the impeller, FIG. 8 illustrates curves for delivery head H and power respectively as a function of the quantity of liquid Q in the case of a conventional pump, and FIG. 9 illustrates the same curves when using a pump according to the invention.

FIG. 1 is an axial sectional view of an immersible liquid pump, chosen by way of example. The pump is provided with a pump casing 1, which encloses in liquid-tight fashion a brushless a.c. motor 2 having a rated power of, for example, 4 kW. The motor 2 has a shaft 3 journalled in a ball bearing 4. Fixedly mounted on the free end of the shaft 3 is an impeller 5. Located in a liquid-tight space in the pump casing 1 is a static inverter 6 which is arranged to receive alternating voltage with mains frequency through a cable 7, and to convert this alternating voltage first to a d.c. voltage and then to an a.c. voltage of selected frequency. In the illustrated embodiment, the motor 2 comprises a 3-phase motor and voltage is supplied over conductors 8, 9 and 10 from the static inverter 6. The impeller 5 is arranged to pump liquid from a liquid inlet 11 and 12 to a helical passage 13 surrounding said impeller and from said passage 13 to an outlet 14, which in the case of an immersible pump is connected to a hose or the like. Arranged on the upper part of the pump casing 1 is a lifting eye 15, by means of which the pump can be connected to a line for lowering the pump to a location from which liquid, normally water or a water-sludge mixture, is to be pumped to a given level.

When the motor 8 of the illustrated embodiment, said motor conventionally being a two-pole motor and supplied with voltage having a frequency of 50 Hz by means of the inverter 6, is supplied with voltage having a frequency of 100 Hz, the motor speed will increase from 3000 r.p.m. to 6000 r.p.m. and the torque will remain unchanged. Thus, there can be selected an impeller with twice the specific speed with remaining values unchanged. If the two-pole motor is replaced with a four-pole motor of the same weight, i.e. the same external dimensions, and the frequency is increase to 200 Hz a speed of 6000 r.p.m. is still obtained and the torque is doubled, because the rotor of a four-pole motor can be made much larger than the rotor of a two-pole motor. The power will increase at the same time, since it is a function of the product of speed$\times$torque, but the inverter is designed to limit the power so as not to overload the motor.

This increase in motor speed makes it possible to change from an impeller with narrow passages, i.e. a high-pressure impeller, to an open type impeller, and in extreme cases to a propeller-type impeller.

FIG. 2 is a simplified view of different types of impeller, where (a) is an impeller of the type illustrated in FIG. 1 which has a higher specific speed n than the impeller of conventional pumps; (b) illustrates a Francis-type impeller having relatively spacious through-flow passages; (c) illustrates a so-called mixed flow impeller; and (d) illustrates a propeller impeller, i.e. an impeller having the highest specific speed. The invention makes it possible to use impellers of the illustrated types a–d, therewith enabling the pump housing 1 to be given small external dimensions, and to provide a high efficiency.

The result of this specifically higher use of the pump, however, results in an increased risk of cavitation, especially when large suction heads are involved. Consequently, a further object of the invention is to reduce this risk, by controlling the speed so that cavitation will not occur or, in all events, is prevented from continuing. It should be observed that in the case of a conventional pump which is directly connected to mains voltage, and particularly in the case of large suction heads or circumstances corresponding to large suction heads caused, for example, by clogged inlet filters, there is no chance of regulating the speed and therewith no possibility of preventing cavitation, which may quickly result in damage to the pump.

Arranged adjacent the impeller 5 in the illustrated embodiment for the purpose of detecting cavitation is a pressure-surge transducer or accelerometer 16 arranged to detect pressure surges present in the liquid when cavitation occurs, and to send a signal to the inverter 6, through a conductor 17, for decreasing the frequency of the output voltage and therewith to decrease the speed of the motor 2 and the impeller 5. The illustrated embodiment also includes a liquid-level sensor 18 arranged to send a signal to the inverter 6, via a conductor 19, for decreasing the frequency and therewith the speed of the motor 2 and the impeller 5. The inverter is suitably set at a high frequency and regulates at the same time so that the output power is held constant, i.e. the motor power output is held constant or at least substantially constant. Consequently, should the lift or head deviate from a nominal or rated value, the motor will attempt to reach a speed corresponding to the higher frequency and therewith increase the flow. A particularly suitable static inverter for use in accordance with the invention will now be described with reference to FIGS. 3–4. In the aforegoing it has been assumed that the inverter is incorporated in the pump casing, although it will be understood that the inverter may be a free-standing unit located externally of the pump.

The static inverter illustrated in FIG. 3 has been chosen by way of example, and includes a three-phase rectifier 60 supplied from an a.c. mains 61. The rectifier 60 supplies a d.c. voltage of substantially constant amplitude via lines 62 and 63, the line 62 lying on positive potential and the line 63 on negative potential, and the voltage being supplied to a static inverter which includes six switching elements 64, 65, 66, 67, 68 and 69 which, in the illustrated embodiment, comprise transistors and which are arranged to successively connect the terminals 70, 71 and 72 of the motor 2 to the positive supply line 62 and the negative supply line 63 from the rectifier 60. As will be understood, thrysitors or like elements can be used instead of transistors. A diode 141 is connected in antiparallel across each transistor for taking-up reactive currents when choking respective transistors. For the purpose of controlling the inverter, control signals are supplied from outputs 73, 74, 75, 76, 77 and 78 of a control means 79, which is shown in detail in FIG. 4. These control signals are supplied via an amplifier 80 to the base of respective transistors. The control means 79 is provided with signal inputs 81, 82 for sensing signals generated when sensing the d.c. current in line 62, and the signal input from lines 56, 57. The speed of the motor 2 is changed in dependence of the amplitude of a voltage signal on the input 56 from a potentiometer 59 (FIG. 4). A start or stop signal is fed to the static inverter via line 57.

The control means 79, which is illustrated in detail in FIG. 4 includes a sensing means 85 for sensing the amplitude of the d.c. current on line 62. The magnitude of this current is in direct proportion to the voltage between the signal inputs or signal lines 81 and 82. The output signal from the sensing means 85, which includes an amplifier 86, is fed to a first peak voltage detector 87, a low-pass filter 88, a second peak voltage detector 89 and a comparator 90. The detector 87 includes a diode 91 for allowing positive signals to pass through, and the detector 90 is a diode 92 for allowing negative signals to pass through. Each detector also includes a low-pass filter. The first detector 87 preferably has a time constant of about 4/f, where f is the maximum fundamental frequency for the voltage supplied to the motor 84. The anti-resonance frequency, −3 dB, for the detector 87 preferebly lies at 0.1 f. The low-pass filter 88 preferebly has the same anti-resonance frequency. The second detector 89 preferably has a time constant of about 1/f and an anti-resonance frequency of about 0.5 f.

The output signal from the detector 87 is fed to a first control circuit 93, illustrated in detail in FIG. 5. The input signals from the line 56,57 is fed to a ramp generator 94, comprising two operational amplifiers coupled to form an integrating circuit for supplying an increasing ramp voltage to the control circuit 93 when the motor accelerates when started, and a decreasing ramp voltage while the motor slows down to a stop. This eliminates the risk of exceeding the loading current which prevails at normal speeds when the motor is started or stopped. A change in the frequency control signal is also integrated by the ramp generator 94, said control signal determining the frequency of the motor current and thus the speed of rotation of the motor, and appearing on the line 56. Consequently, a certain period of time lapses before the output signal from the ramp generator 94 is completely adapted to the input signals.

The signal from the first detector 87 (FIG. 5 is fed to one input of an operational amplifier 96 over a resistor 95. This signal is compared by the amplifier 96 with a reference signal, which is set by means of a variable resistor 97 and which is fed to said one input over a resistor 98. The other input of the amplifier 96 is earthed, and the amplifier is fed back by means of a resistor 99. Any deviation between the signal arriving from the detector 87 and the reference signal gives rise to an output signal from the amplifier 96, this output signal being supplied, via a resistor 100 and a diode 103, to one input of an operational amplifier 101, the other input of which is earthed. The output signal of the ramp generator 94 is also supplied to said one input of the amplifier 101, via a resistor 102. The amplifier 101 is fed back by means of two resistors 104 and 105 in series with the diode 103. The resistor 105 has a much lower resistance than the resistor 104, and the resistance relationship is preferably about 1:20. When the output signal of the first operational amplifier 96, measured on the diode 103, is more negative than the output signal from the second operational amplifier 101, measured on the diode 103, is positive, the voltage on the diode 103 is inversed. Amplification of the amplifier 101 in the closed loop will then become high, and the control circuit 93 will operate along the line 106 in FIG. 6, assuming a constant output signal from the ramp generator 94. If the output signal from the first detector 87 increases as a result of the direct current from the rectifier 60 increasing, the output signal from the amplifier 96 will be less negative and at a given signal level, designated 107 in FIG. 6 and pre-set by means of the resistor 97, the diode 103 will be biased in the conducting direction. This means that amplification of the amplifier 101 drastically decreases, so that the control circuit 93 transmits a frequency control signal according to the line 101 in FIG. 6. This signal becomes zero at about 120% of the signal on level 107. The frequency control signal from the output of the amplifier 101 is fed to a voltage-controlled oscillaton (VCO) 109 and to an analogue division circuit 110. This division circuit 110, which is, for example, of the commercially available kind Analog Devices AD 534, builds a signal which is $1_{average}/f$, where $1_{average}$ is the mean value of the magnetisable current to the motor prevailing at that moment and f is the frequency. This signal is an adequate indication of the axle torque of the motor. The voltage controlled oscillator 109 generates an output signal at a frequency which is proportional to the input voltage.

The rectified mean value signal, which is obtained from the low-pass filter 88, corresponds to the power input to the motor 2, since the voltage on the supply lines 62 and 63 is substantially constant. The signal is fed to the division circuit 110, where the signal is divided with the frequency control signal from the amplifier 101, which constitutes an order signal for determining the speed of rotation of the motor. Thus, the output signal from the division circuit 110 will correspond to the torque which the motor is required to produce. The output signal from the division circuit 110 is supplied to a second control circuit 111, and constitutes a first voltage control signal. THe negative signal from the second peak value detector 89 forms a second voltage control signal, and is supplied to the second control circuit 111, whereby the output signal from the control circuit 111 becomes proportional with the difference between the first and the second voltage control signals. The negative signal from the detector 89 corresponds to the degree of magnetization of the motor 2 and is obtained from negative pulses, which are fed back to the d.c. voltage source when the transistors 64–69 are non-conducting. By controlling the amplitude of these negative pulses, it is possible to reach a given level of magnetization of the motor, and therewith to obtain a high ratio of power to weight and to avoid supersaturation, which causes losses. The aforedescribed motor construction thus affords important advantages.

If the signal from the detecting means 85 exceeds a given determined value, the output signal from the comparator 90 will have a low value, said comparator comparing the output signal with a reference signal obtained by means of an adjustable resistor 112. As a result hereof, the outputs 74, 76 and 78 from AND-gates 116, 117 and 118 will lie at a low level. This means that the transistors 65, 67 and 69 will change to a non-conducting state, so that the terminals 70, 71 and 72 are not connected to the negative terminal of the d.c. voltage source or line 63. This disconnection of the motor terminals protects the inverter from damage caused by transient currents.

The output signal from the voltage controlled oscillator 109 is fed to a timer 119, preferably an industrial timer of standard type 555, and a division circuit 120. The division circuit 120 preferably comprises a programmeable counter arranged to transmit a pulse train at a frequency which is equal to the frequency of the input signal divided by a selected constat. The timer 119 transmits a pulse train at a frequency equal to the frequency of the output signal from the oscillator 109. The pulse width is controlled by the output signal from the second control circuit 111. The pulse train from the timer 119 is fed to AND-gates 121, 122 and 123. The pulse train from the division circuit 120 forms a clock signal for a ring counter 124. A logic "1" and five logic "0" are stored in the ring counter 124. The logic "1" is shifted in the counter by the pulse train from the output 125 of the counter to the output 126, from there to the output 127 and further to the output 128, from the output 128 to the output 129 and further to the output 130, and from the output 130 back to the output 125. This shifting of the logic "1" stored in the counter 124 from the output 125 back to said output 125 corresponds to a period in the fundamental frequency of the voltage supplied to the motor 84. The output signals from the outputs 125-130 of the counter 124 are de-coded by OR-gates 131, 132 and 133. The output signal from respective gates lies for half the time at a high level and for half the time at a low level. A logic signal inverter 134 and NAND-gates 135, 136, 173, 138, 139 and 140 are arranged to control the direction of rotation of the motor 2 should it be desirable to change direction. The output signals from the gates 131, 132 and 133 are fed to the AND-gates 116, 117, 118, 121, 122 and 123, for controlling the switching transistors 64–69 in the inverter. The inputs of the gates 116, 117 and 118 are coupled to logic signal inverters 142, 143 and 144. Because the pulse width of the pulses from the timer 119 are constantly independent of the frequency if the signal from the control circuit 111 is constant, the mean value over half the period of the fundamental frequency of the voltage will be changed simultaneously with the frequency. Further regulation of the mean voltage can be obtained by varying the pulse width, which is regulated by means of the control circuit 111.

The frequency signal from the frequency determining circuit, which signal is fed in over line 56 to the ramp generator 94, forms a set-point value which determines the frequency, and therewith the speed of the motor.

As previously mentioned, should cavitation occur there is effected a change in frequency such as to reduce the speed of the motor 2, and a frequency decrease signal is obtained from the accelerometer 16 (FIG. 1), which sends a frequency decrease signal to the inverter via the conductor 17. The accelerometer is suitably of the piezo-electric type and reacts to the sound peaks which are propagated through the liquid when cavitation occurs. In this case, the signals on line 17 are fed to the line 56 and cause the frequency to be lowered. The liquid-level sensor 18 (FIG. 1) is arranged, should there be no pressure liquid in the channel or passage 13, to generate a frequency decrease signal over line 19, this frequency decrease signal being fed to line 56 and ensuring that the motor 2 will not exceed a given idling speed. Optionally, the signal can be fed in on line 57, and forms a stop signal.

In order to illustrate the advantages afforded by the invention still further, reference is now made to FIGS. 7–9. FIG. 7 illustrates the efficiency $\eta$ of a relatively small pump, for example having a power output of 2–60 kW, as a function of the specific speed $n_q$. As before-mentioned the impellers of conventional liquid pumps have a low $n_q$, for example between 12 and 24 r/min, which means that the efficiency lies between 22 and 58%. At the higher specific speeds of the pump rotor which can be used in accordance with the invention, the efficiency will reach a maximum, i.e. an efficiency of above 70%.

FIG. 8 illustrates a pump diagram for a conventional, immersible pump having a power output of 4–10 kW. In the diagram, the curve H shows the delivery head in meters and the power input P to the impeller in Kw, said power input being equal to the power output of the a.c. motor. FIG. 8 shows that two power areas A and B respectively lie beneath the maximum power output of the motor. These two areas are utilized in accordance with the invention in that the regulating or control system automatically adjusts the motor to rated or nominal power, i.e. the motor delivers the power $P_{max}$ wherewith an impeller of high specific speed can be used, resulting in an increase in delivery head H and/or flow quantity Q, as shown in FIG. 9, which relates to a pump having the same motor output but controlled in accordance with the invention so as to enable a high specific speed impeller to be used.

The described pump and inverter can be modified in many ways within the scope of the claims.

I claim:

1. A method of driving an impeller of a liquid pump by means of a brushless a.c. motor operating at a relatively low power output and high delivery head, comprising the steps of: supplying the motor with electric power through a regulatable static inverter having an output frequency in the order of 100–1000 Hz, detecting the load on the motor, producing a control signal in response to said load, and delivering said control signal to said inverter in order to regulate the output frequency thereof and thus the speed of the motor, so that substantially constant power is supplied to said motor irrespective of the load.

2. A method according to claim 1, further comprising the steps of: sensing a cavitation state in the pump, and regulating the output frequency of the inverter so that the impeller speed is maintained at or beneath a cavitation-free maximum value.

3. A liquid pump comprising: an impeller (5), a pump housing (1) for housing said impeller (5), a brushless a.c. motor (2) for driving said impeller, a regulatable static inverter (6) for supplying electric power to said motor (2) and having an output frequency in the order of 100–1000 Hz, means (86,87) for changing the output frequency of the inverter so that substantially constant power ($P_{max}$) is delivered to the motor irrespective of the load on said motor.

4. A liquid pump according to claim 3, characterized in that the inverter (6) is incorporated in the pump housing (1), together with the motor (2) and the impeller (5).

5. A liquid pump according to claim 3 or claim 4, further comprising a cavitation-detecting means (16) located adjacent the impeller (5), said cavitation-detecting means being coupled to said inverter such that upon the detection of cavitation the output frequency of the inverter (6) is lowered, so as to reduce the speed of the motor (2) and the impeller to a cavitation-free value.

6. A method of driving the impeller of a liquid pump, operating at a relatively low power output and high delivery head, by means of a brushless a.c. motor comprising the steps of: supplying the motor with electric power from a regulatable static inverter having an output frequency in the order of 100–1000 Hz, regulating the output frequency of the inverter to maintain the rotational speed of the impeller at or beneath the cavitation-free maximum value.

7. A method according to claim 6, further comprising the step of controlling the inverter to deliver, in the unregulated state, an output frequency to the motor, such that the impeller is driven at a speed which exceeds the cavitation-free maximum value.

8. A liquid pump comprising: an impeller (5), a pump housing (1), a brushless a.c. motor (2) for driving said impeller, a static inverter (6) arranged to supply energy to said motor at an output frequency in the order of 100–1000 Hz, sensing means (16) for detecting a cavitation state in the pump, and control means (79) for producing, upon the detection of cavitation, a control signal which causes the inverter (6) to lower its output frequency, and thus the speed of the impeller, so that said cavitation ceases.

9. A liquid pump according to claim 8, comprising control means for controlling said inverter, in its unregulated state, to deliver an output frequency at which cavitation occurs.

10. A liquid pump according to claim 8 or claim 9, wherein said sensing means comprises a pressure surge transducer (16) located adjacent the impeller.

11. A method of driving the impeller of a liquid pump by means of a brushless a.c. motor operating at a relatively low power output and high delivery head, comprising the steps of:
 (a) supplying energy to said motor through a regulatable static inverter having a rated output frequency of from 100–1000 Hz;
 (b) sensing impeller conditions to anticipate the likely occurrence of a cavitation state;
 (c) producing an inverter control signal when the sensing of said impeller conditions indicates that a cavitation state in the pump is imminent, and
 (d) applying said inverter control signal to said inverter, so as to regulate the inverter output frequency to a level at which cavitation will no longer be imminent.

* * * * *